United States Patent
Mönch et al.

(10) Patent No.: US 12,019,737 B2
(45) Date of Patent: Jun. 25, 2024

(54) PROTECTING SENSITIVE DATA IN A SOFTWARE PROGRAM

(71) Applicant: NAGRAVISION SÀRL, Cheseaux-sur-Lausanne (CH)

(72) Inventors: Christian Mönch, Cheseaux-sur-Lausanne (CH); Asfandyar Orakzai, Cheseaux-sur-Lausanne (CH)

(73) Assignee: NAGRAVISION SÀRL, Cheseaux-sur-Lausanne (CH)

( * ) Notice: Subject to any disclaimer, the term of this patent is extended or adjusted under 35 U.S.C. 154(b) by 257 days.

(21) Appl. No.: 17/295,455

(22) PCT Filed: Nov. 18, 2019

(86) PCT No.: PCT/EP2019/081619
§ 371 (c)(1),
(2) Date: May 20, 2021

(87) PCT Pub. No.: WO2020/109049
PCT Pub. Date: Jun. 4, 2020

(65) Prior Publication Data
US 2022/0012330 A1 Jan. 13, 2022

(30) Foreign Application Priority Data
Nov. 30, 2018 (EP) .................................... 18209644

(51) Int. Cl.
G06F 21/62 (2013.01)
G06F 21/52 (2013.01)
G06F 21/54 (2013.01)

(52) U.S. Cl.
CPC .............. *G06F 21/54* (2013.01); *G06F 21/52* (2013.01); *G06F 21/6245* (2013.01); *G06F 2221/033* (2013.01); *G06F 2221/2149* (2013.01)

(58) Field of Classification Search
CPC .......... G06F 21/52; G06F 21/54; G06F 21/60; G06F 21/62; G06F 21/6218;
(Continued)

(56) References Cited

U.S. PATENT DOCUMENTS 4,920,538 A 4/1990 Chan et al.
9,830,149 B2 11/2017 Abadi et al.
(Continued)

FOREIGN PATENT DOCUMENTS

WO 02 27444 A2 4/2002

*Primary Examiner* — D'Arcy Winston Straub
(74) *Attorney, Agent, or Firm* — Maier & Maier, PLLC

(57) ABSTRACT

The disclosed method is concerned with a computer implemented method generating code for protecting sensitive data used by the program, by partitioning the program into a plurality of blocks of code, such that each code block in the program is registered using a code index in a code register created for the program. The code index for a given code block reflects current properties including the current location of the code block, at any given time. During execution of the program at runtime by the computing device, each code block of the program is moved from a first code location in a memory to a respective second code location in the memory, such that the code block is accessible from the second code location in the memory henceforth. The code index for the moved code block is updated to indicate updated current properties, such as the new location of the code block, i.e. the second code location, after moving the code block. In addition to moving the code to the second code location that is different to the first code location; one or more references stored in the memory and that are
(Continued)

required for the execution of the code block, i.e. which are accessed by the code block and/or are required to access the code block, are also associated with the moved code block. To enable the association, the one or more references for the code block are registered in a reference register, such that a reference index reflecting current properties for each of the one or more references is adjusted based on updated current properties of the code index of the moved code block.

13 Claims, 4 Drawing Sheets

(58) Field of Classification Search
CPC ............ G06F 21/6245; G06F 2221/03; G06F 2221/033; G06F 2221/21; G06F 2221/2149
See application file for complete search history.

(56) References Cited

U.S. PATENT DOCUMENTS

| | | | |
|---|---|---|---|
| 10,140,130 B2 | 11/2018 | Wesie et al. | |
| 10,868,665 B1* | 12/2020 | Pohlack | H04L 63/1441 |
| 10,885,184 B1* | 1/2021 | Schnidrig | G06F 21/54 |
| 2015/0047049 A1* | 2/2015 | Panchenko | G06F 21/14 |
| | | | 726/26 |
| 2018/0024823 A1* | 1/2018 | Craik | G06F 9/4552 |
| | | | 717/152 |
| 2018/0046585 A1* | 2/2018 | Okhravi | G06F 12/023 |

* cited by examiner

PROTECTING SENSITIVE DATA IN A SOFTWARE PROGRAM

FIELD

The present disclosure relates to software security, particularly to protection of software from reverse engineering or tampering attacks. In particular, the present disclosure is concerned with protection against reverse engineering attacks that are aimed to extract sensitive information from software programs, for instance programs that run on applications or devices that store or utilise sensitive data, i.e. client devices or applications for Video on Demand (VOD) or other services that require user information for authentication or access.

BACKGROUND

Software applications may be a target of reverse engineering or software tampering attacks. To make them less prone to such attacks, various software protection techniques can be deployed. Such protection techniques are typically implemented by modifying the original source code of a program implementing a software application, to alter its structure and/or add extra security functions such as runtime integrity verification functions, i.e. checksums. In practice, however, the modified code or security functions themselves may be subject to malicious identification and analysis.

In addition, during runtime some software programs may access and store data, including sensitive data, at certain positions in a memory area. If an attacker is able to identify such positions, it would then become possible to extract sensitive data from the program while it is executing at runtime. It is possible to structure the program in such a way that the code that accesses sensitive data masks such data with some mask/key. Usually the mask is changed at certain intervals, making it difficult to read the sensitive data by just looking at the location where it is stored. However, since the location of code does not change and since the code itself cannot be masked because it has to be interpreted by hardware resources, it is possible for an attacker to read the mask out of the code and subsequently use the mask to access sensitive data.

DETAILED DESCRIPTION

Figure 1:
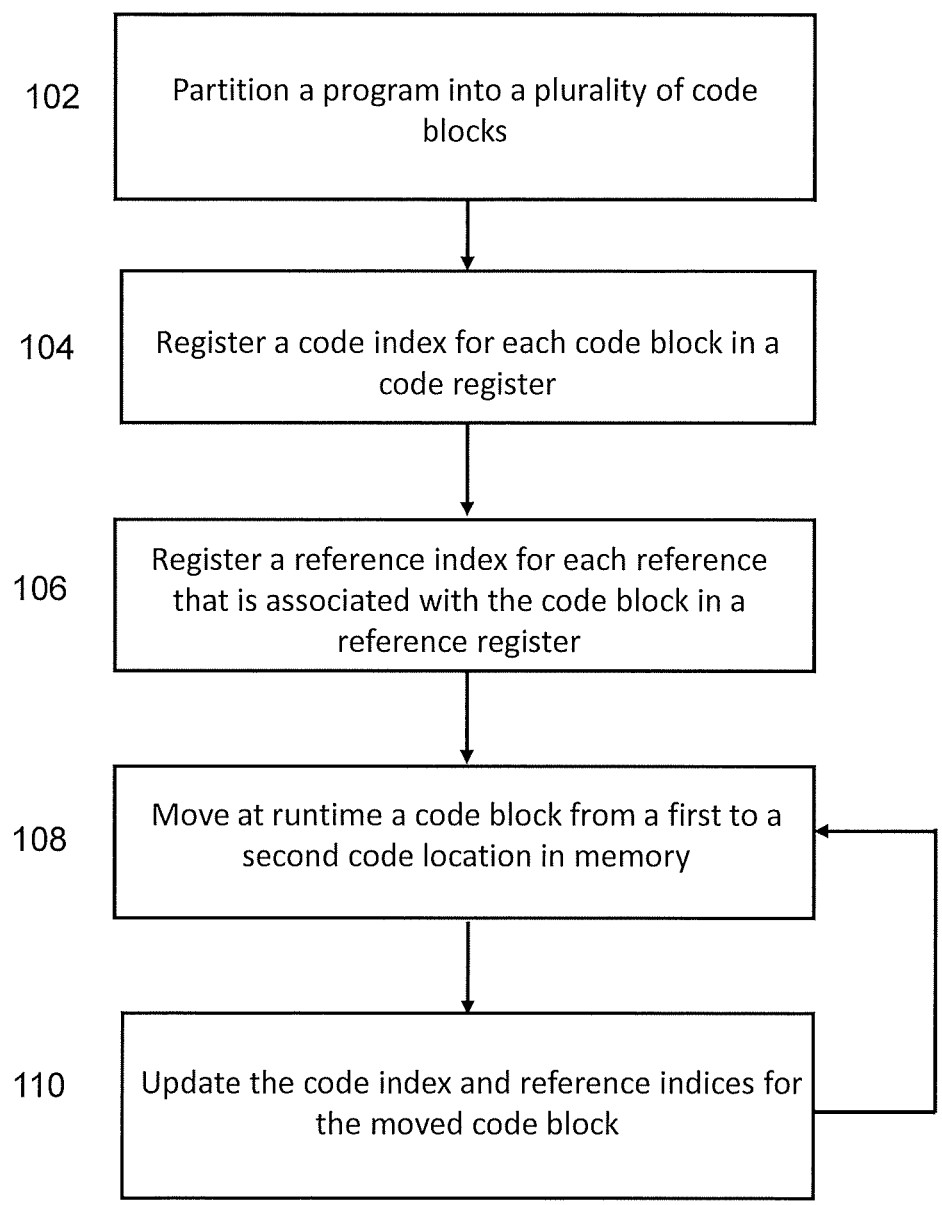
FIG. 1 depicts a flowchart for moving code blocks at runtime of a software program according to the disclosed methods.

The present disclosure relates to a computer implemented method for moving code, and in some embodiments data, of a software program at runtime to new memory locations.

In overview, methods for generating code for software applications are provided. A software program that is understood to comprise a set of programming instructions, i.e. the code, which can be executed on one or more computing devices. The computing devices typically may comprise one or more processors and a memory. The processor is configured to execute the code, and the memory is configured to store the code, i.e. programming instructions, along with data and/or variables that may be required for executing the programming instructions. The software program may be created by a compiler that reads source code and emits the program. Thus, in some embodiments the program referred to herein relates to the machine code instructions, i. e. bytes in memory. When the code is executed, this is referred to as runtime. The code can be written using a known programming language such as C, C++ etc. that compiles to native code.

In one aspect, the disclosed method is concerned with a computer implemented method generating code for protecting sensitive data used by the program, by partitioning the program into a plurality of blocks of code, such that each code block in the program is registered using a code index in a code register created for the program. The code index for a given code block reflects, i.e. indicates or includes, current properties including the current location of the code block, at any given time. In some embodiments each code block is considered to be a basic block of code, that is understood to represent a portion of the program that can be executed without relying on any other parts of the program. During execution of the program at runtime by the computing device, each code block of the program is moved from a first code location in a memory to a respective second code location in the memory, such that the code block is accessible from the second code location in the memory henceforth. In some embodiments, the code block may be moved to a one or more subsequent code locations after the second code location during runtime. The code index for the moved code block is updated to indicate updated current properties, such as the new location of the code block, i.e. the second code location, after moving the code block. In addition to moving the code to the second code location that is different to the first code location; one or more references stored in the memory and that are required for the execution of the code block, i.e. which are accessed by the code block and/or are required to access the code block, are also associated with the moved code block. These references may be for example, data, i.e. data objects, and/or data structures, variables, control flow instructions, function pointers etc. To enable the association, the one or more references for the code block are registered in a reference register, such that a reference index reflecting current properties for each of the one or more references is adjusted based on updated current properties of the code index of the moved code block. In some embodiments, the code block may be moved to a one or more subsequent code locations after the second code location during the execution of the program.

In some embodiments the one or more references for a given code block is included in a data block, and the reference indices for the one or more references is comprised in or associated with a data index for the data block. The data index is stored in or associated with a data register for the program. In some embodiments there may be a plurality of data blocks for the given code block, and in related embodiments there may be at least one data block in the plurality of data blocks associated with one or more other code blocks of the program.

The disclosed method advantageously prevents an attacker from finding the location of code that handles sensitive data during execution of a software program. This can be usefully applied for example in programs that access personal details or payment details for one or more users to provide access to software-based VOD client applications or devices, programs that handle financial records, programs that handle healthcare data etc. Moving one or more portions, i.e. code blocks, of the program as well as adjusting or updating any references associated with the program during runtime, ensures that the program moves parts of itself within memory making it impossible for an attacker to find the current copy of the code that accesses sensitive data that may or may not be masked and may or may not have been moved Thus, such moving of code blocks and updating of references during runtime of a process advantageously prevents code location-based extraction of sensitive data. In some embodiments the movement of the code block can take place either periodically or randomly or a combination of both, at defined and/or arbitrary intervals. In some embodiments, it is possible for the program to move code blocks almost constantly (at high frequencies). This makes it very hard for an attacker to read the mask or data out of the code.

In some embodiments, during execution of the program one or more data blocks (each including the one of more reference for a code block) are also moved from a first data location in the memory to a respective second data location in the memory at runtime, such that a given data block is accessible from the second data location in the memory henceforth. In some embodiments, the given data block may be moved to a one or more subsequent data locations after the second data location during the execution of the program. The data index of the given data block is updated to reflect current properties, including a current location of the data block at any given time. In some embodiments the code locations are different to the data locations in the memory to ensure that a code block and any associated data block is not moved to the same location at the same time.

Advantageously, the above discussed embodiments prevent data location-based attacks during runtime of the software program. A potential attacker could easily leak sensitive data out of a program executing at runtime if the memory location in which such data used by the program is identified. If the data location is identified, an attacker may be able to find ways to read or modify the data. In the above discussed embodiments, as data required for the execution of the program (in the form of data blocks) is also moved to one or more new memory locations in addition to moving the code, an attacker cannot rely on a once identified data location for a data block to extract sensitive data.

Moving code blocks and data blocks also make it harder to maliciously patch, i.e. create a file with instructions to modify execution of, a portion of the program. In a program where there is a movement of code blocks as well as data block according the disclosed methods, any attempts for patching would require changes in several metadata structures, which is very hard to implement as and when the code blocks as well the data blocks move at runtime.

In an alternative aspect of the disclosed method, a data block or a plurality of data blocks may be moved first, before moving a code block or a plurality of code blocks. Assuming that data associated with the code is initially masked, which although is not essential is usually the case, an aim of this alternative aspect is to move data to different memory locations first. This has an advantageous effect of preventing an attack by a malign party that is purely based on location of the data. In embodiments related to this alternative aspect, after moving the data block the associated code block or blocks is moved. For instance, this may include copying the code (in the code block) to a new memory location and modifying the new copied code to access the initial moved data block at its current (recently moved) data block location. This embodiment advantageously prevents an attack based on identifying the code that accesses the data that has been moved, and further prevents any determination of any mask that may have been used on the code or data. Although the rest of the disclosure and disclosed methods herein discuss code moving first followed by data moving, i.e. moving of code blocks first before moving data block at runtime, a skilled person will appreciate that the operations of data and code moving are technically independent of each other and there is no strict order associated with these moving operations. It is possible to move data before code or code before data according to the disclosed methods. In addition, it is also possible for code moving to be performed multiple times before data is moved; and similarly, data can be moved multiple times before code is moved. Thus, although the following description discusses the aspect of moving code blocks first in more detail, the present disclosure is not to be considered as being limited in any way to this order. Moving data first before the code, as set out in the above in the alternative aspect, is also within the scope of the present disclosure as there is no need for a particular order for code or data moving in the below disclosed techniques to achieve the above discussed and further described technical advantages.

In some embodiments, code portions within a given code block are modified when a data block that is accessed by the given code block is moved. This is so that a portion of the given code block accessing one or more references in the data block is updated during runtime to correctly access the data indices of the one or more references.

In some embodiments the moving of a data block can take place either periodically or randomly or a combination of both at defined and/or or arbitrary intervals. In some embodiments, the second and/or subsequent code and data locations are randomly selected or assigned at runtime. This advantageously ensures that there is no prior indication of the location that the code or data block is to be moved to.

The above discussed embodiments advantageously prevent an attacker from continuously examining code that accesses the sensitive data in the hope of inferring a current position of sensitive data from any changes made to the code at runtime. This is because the code as well as the data is moved to randomly selected new memory locations during runtime of the program.

A further advantage of the above discussed embodiments is that any attacks on software-based checksums that may be in place for protecting the integrity of the program are also prevented. One typical attack on a software-based checksum is to create a copy of unmodified instructions of the program, i.e. the machine code instructions which may be bytes in memory in a memory location and to redirect all read operations into this memory location. The redirection of such memory reads can be set up with the help of existing memory management units such that code or instruction fetches are still performed on an original memory location of the code. Thus, if the original code is changed, the checksum in place would not realise that the code integrity has been compromised as it is still performing reads using the unmodified copy of the code in a different memory location. Such an attack on a program implementing code and data moving according the disclosed methods, will lead to a non-working program.

In some embodiments moving a code or data block of the program includes copying the code or data block to a new memory location, i.e. the second or subsequent code or data locations mentioned above. Advantageously, such copying of code and/or data blocks makes it very difficult to an attacker to determine the current location of the code. This is because the code would be replicated multiple times throughout memory, each copy is usually different, especially if the data block is also moved. Malign parties or programs would not be able to easily identify which copy is the one that is currently being used, i.e. the correct copy.

In some embodiments a code block of the program is an extended basic block, i.e. hereinafter EBB, which is copied to one or more new code locations in the memory. EBBs are consecutive basic blocks in which the last basic block ends in unconditional control transfer instruction or a return instruction. In related embodiments, control flow instructions or changes inside the EBBs are adapted to one or more new code locations. This adaptation is implemented by adding a jump table at the end of the EBB in some embodiments. Any external references to the moved EBB that are indicated in the code index for each of the basic blocks of the EBB are then updated to reflect the move.

The advantage of using EBBs is that an EBB can be copied from an original location to a new location without requiring any code to be added behind it for retaining its semantics. If basic blocks that end with a conditional jump or flow transfer are copied to a new code location, it would then become necessary to append one or more additional instructions to handle the fall-through case of the condition. This is possible but would require more manipulation before the indices for the references and the code can be updated, i.e. in other words fixed, for the moved basic block.

In some embodiments, after an EBB has been moved, the one or more references to the EBB are associated with the respective new locations of the moved basic blocks of the EBB by updating the reference index of each basic block. In some embodiments the one or more references to the EBB are present in other code blocks that are not part of the EBB, or in one or more data blocks.

In some embodiments, the data register includes three data structures to facilitating moving, i.e. copying data blocks at runtime. The data structures are:
  (i) a location registry for associating each memory location that contains the first byte of a data block, i. e. the start/beginning of the data block, with an entry in a type registry.
  (ii) a type registry that includes details about the size of a data type in the data block and the number and offsets of pointers for each type.
  (iii) a global reference registry that includes an index of all code blocks of the program that reference global data, i.e. all instructions that that contain an absolute (global and thus non-variable) address to data.

Metadata is generated for moving each code block and/or each data blocks during runtime of the program. According to some embodiments of the disclosed methods, such generated metadata is also moved from a first metadata location in the memory to a second metadata location in the memory. In some embodiments, the metadata for a code or data block may be moved to one or more subsequent locations after the second metadata location during runtime.

Advantageously, by moving the metadata any location-based attacks on metadata that are like the attacks on code and data as discussed above, are also prevented. Moving metadata in some embodiments is done in an analogous manner to moving one or more data blocks as set out above.

The present disclosure also relates to a computing device or system that includes one or more processors associated with a memory for storing data and instructions and/or one or more computer readable medium that may be transitory or non-transitory. The one or more processors are configured to execute the instructions to implement embodiments of the disclosed methods set out above.

Some specific embodiments are now described by way of illustration with reference to the accompanying drawings, in which like reference numerals refer to like features With reference to FIG. 1, a method of moving code blocks during runtime execution of a program is disclosed. The disclosed method is concerned with relocating, i.e. moving, one or more code blocks of a software program in a memory, when the program is executing on a computing device (at runtime), the computing device having one or more processors associated with the memory that is accessible by the code and associated functions, variables and data. In some embodiments the code blocks are moved in chunks, i.e. in Extended Basic Blocks, EBBs. Although the specific examples below are discussed for an EBB, it is to be understood that the present disclosure is not in any way limited to using EBBs. As mentioned above, a code block can also be a single basic block, which may include for example an appended handling for a fall through case, if it ends in a conditional branch.

In Step 102, a software program that handles sensitive data is partitioned into a plurality of code blocks, where each code block (which may be an EBB) is stored in a particular code location in the memory associated with the processor or computing device at or using which the program is executed at runtime In Step 104, a code index for each code block in the program is registered in a code register that is stored in or associated with the memory. The code index includes or is associated with an entry for a given code block in the code register. The code register includes a plurality of code indices. The code index or the entry in some embodiments includes or indicates current properties of the given code block, including a current code location of the given code block in the memory.

Considering that the code block is an EBB, for example, then the following is a non-exclusive list of examples of properties for each EBB stored in the code register using the code index. The properties may be stored as records in the code register.
  i) Unique index number of the EBB
  ii) Original (first) code location of the EBB, as well as the current code location of the EBB if the current code location is different to the original code location. In some embodiments a previous code location to the current code location is also included
  iii) Original size of the EBB
  iv) The number of consecutive basic blocks and the size of each basic block In step 106 a reference index for each reference, i.e. a data or instruction, that is associated with a given code block among the plurality of code blocks is registered in a reference register. The references may be data (data objects), data structures, variables, control flow instructions or function pointer etc. that are accessed by the given code block, or that access the given code block. In some embodiments, the references that are associated with each code block include or access sensitive data that is to be protected during execution of the code.

Like the code index in step 104, the reference index includes or is associated with an entry for a given reference in the reference register. Considering that the code block is an EBB, for example, then the following is a non-exclusive list of examples of references for each EBB stored in the reference register as one or more records, using reference indices.
  i) The number of immediate control flow instructions or transfers in the EBB
  ii) The offset for each control flow instruction or transfer in the EBB
  iii) The type of each control flow instruction or transfer. This can be, for example indicating if the control transfer is absolute subroutine call or an absolute or relative conditional jump
  iv) The number and offset of all local or global function references and/or local and global variable references in the EBB In step 108, during runtime execution of the program (that has already been split into a plurality of code blocks in step 102), at least one code block among the plurality of code blocks is moved from a first code location to a second code location in the memory.

The second code location in the memory is different to the first code location. Moving the code block during runtime includes copying the code block to the second code location. The moving, i.e. copying of the code block is implemented by a copy operation or function at runtime. The copy operation is a computer implemented instruction that is also executed as part of the execution of the program at runtime.

In some embodiments, it is possible for a single EBB to be moved to one or more subsequent locations after the second code location, each subsequent location being distinct to any other previous code location of the EBB.

In some embodiments, the first code location is always the original code location. This is advantageous in programs that include a checksum for verifying the integrity of the program at runtime, i.e. to ensure that the code is not tampered with. Thus, when the EBB is always moved, i.e. copied, from the original code location, it will be possible for the correct checksum to be computed when one or more software integrity checks are done for the program. In some embodiments, where software integrity checks do not rely on a checksum calculation, the first code location may be the present code location of the given code block. This may be the original code location, or it may be different to the original if the given block had been previously moved from its original code location.

As mentioned above in Step 106, the reference register incudes references indices for all references that are associated with each code block in the program. In some embodiments, the reference register includes the number and location of all control transfers in an EBB.

In some embodiments, EBBs may be moved repeatedly by copying instructions from the original code location to a new (second or subsequent) code location. In some implementations, a move (copy) operation for an EBB can be performed iteratively. For an iterative move to be implemented, all instructions up to the next control transfer for the EBB are copied to the new code location first, before considering the rest of the EBB.

In one implementation example, when an EBB is copied, the copy operation may convert all relative 8-bit jumps into relative 32-bit jumps during copying.

In step 110, after moving, i.e. copying, the code block or EBB in the present example, to the second (new) code location, the properties of code block and any associated references are updated to the second code location in the memory. Thus, the code index and reference indices in the code register and the reference register are updated for the moved EBB. In some examples, this step of updating the code and reference indices for the moved code block is also referred to as "fixing" the code block and it's references to the second code location.

While an original code location for the EBB does not change, the current and any previous code located are updated when the EBB is moved to any new code location in memory. Thus, in the code register the current location of the EBB is updated to reflect the new memory address of the EBB (which will be the second code location in this case). If the code register includes a previous location record, this record is also updated to the earlier code location of the EBB before it was moved to the new code location in the memory.

Whenever an EBB is moved, all references in the reference register that transfer control to the moved EBB are also updated, i.e., fixed to refer the new memory location.

In some embodiments, when one or more references associated with a moved code block are control flow instruction, such as a jump instruction, then updating the reference register to fix such instructions to the new code location of the code block often requires the previous location of the code block.

In some embodiments, a portion of instructions of the moved block is modified for the moved block. This modification is for the adaption of conditional and unconditional control flow or transfer instructions in the code, i.e. adaption of jumps, branches and subroutine-calls.

Some examples of fixing conditional and unconditional control flow or transfer instructions for a moved EBB is given below:
  i) Intra-EBB jumps, i.e. local jumps that have a destination within the same EBB, can be fixed by using the original version of the EBB. One reason for fixing intra-EBB jumps is because sometime the EBB size, and therefore the relative position of instructions within an EBB, changes when there is an 8-bit to 32-bit conversion for a jump. In addition, any absolute jumps are adjusted to the new code location of the EBB as well.
  ii) Inter-EBB jumps, i.e. jumps that have a destination in a different EBB, can be fixed by using either the current EBB or the latest copy of the EBB that was created after the latest (the last) moving or copying operation. The original version of the EBB (which in some embodiments is used for all copying operations) is not modified, as doing so would change the checksum. Furthermore, if the original EBB is modified then an attacker may be able to deduce the new code location of the code block from the modified original EBB.

Thus, advantageously the only location where a current destination of a control transfer in the EBB is stored is in the most current copy of it prior to it being moved. Consequently, this last copy is used to find the current destinations of all inter-EBB jumps that existed prior to the move, so that it can be updated in the moved EBB, accordingly.
  iii) When an EBB is moved, all EBBs that are transferring control to the moved EBB are updated to transfer control to the new code location. The reference register also includes, for each EBB a list of all EBBs that transfer control to it.
  iv) All other EBBs that have references into a moved EBB are fixed.
  v) All references from a moved EBB into other EBBs are adapted since the moved EBB is copied from its original location (which would not contain the any previously updated references as the original is not modified in some embodiments). After an EBB is copied from the original code location to the new code location, the references to other EBBs are updated.

vi) All non-code related global and local references are fixed, since the EBB is copied from the original location that is unmodified. The reason for this is that any moved global objects will not be reflected in the original EBB used for the copying operation in step 108.

vii) Finally, references to moved EBBs in the application data are fixed. EBBs are not only referenced in other EBBs but also in application data, for example in function pointers, data objects etc. that are present in the reference register. Therefore, application data is adapted after an EBB is moved.

Data moving relates to an embodiment in the present disclosure that refers to the ability to move data that is dynamically allocated during runtime of the program to different memory locations.

Figure 2:
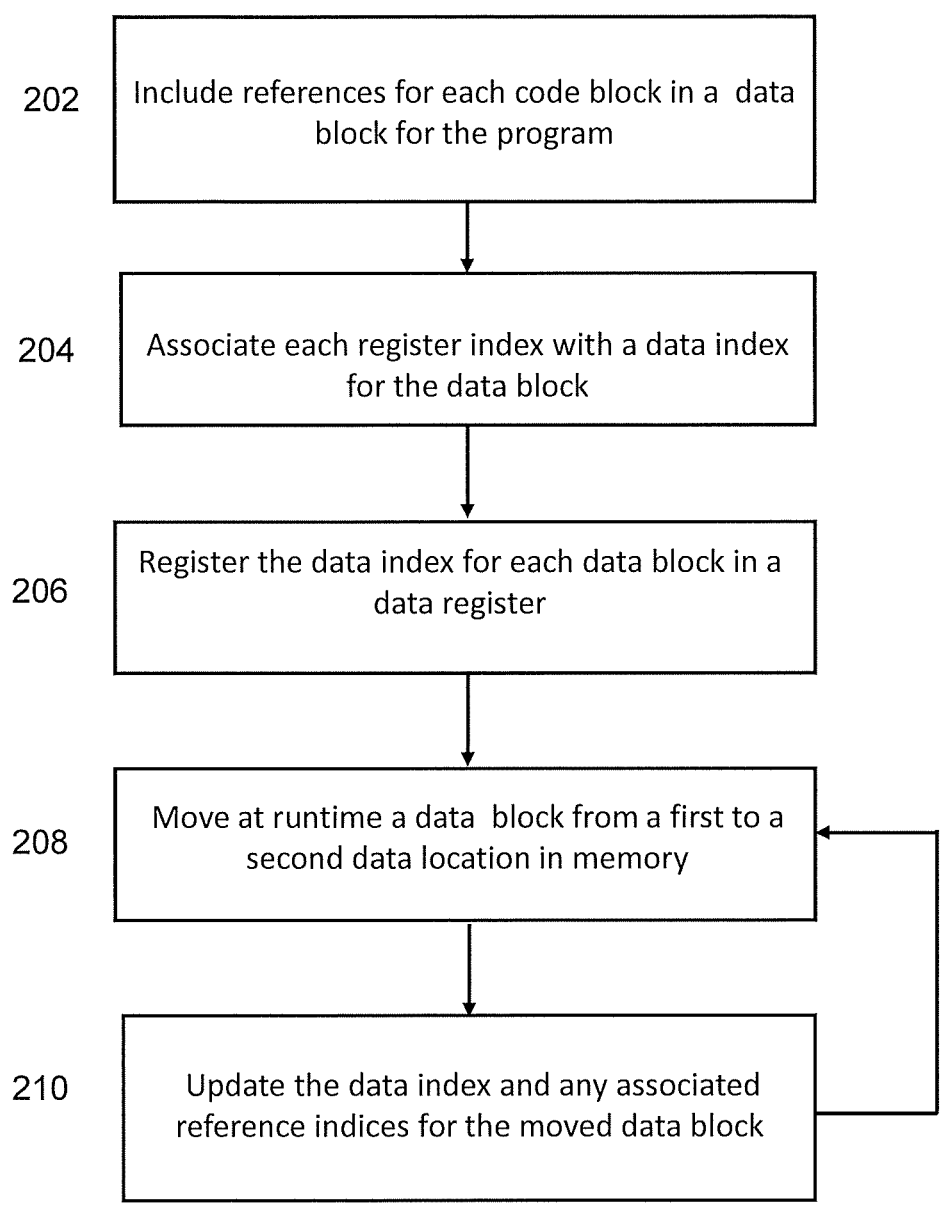
FIG. 2 depicts a flowchart for moving data blocks at runtime of a software program according to the disclosed methods.
Figure 3:
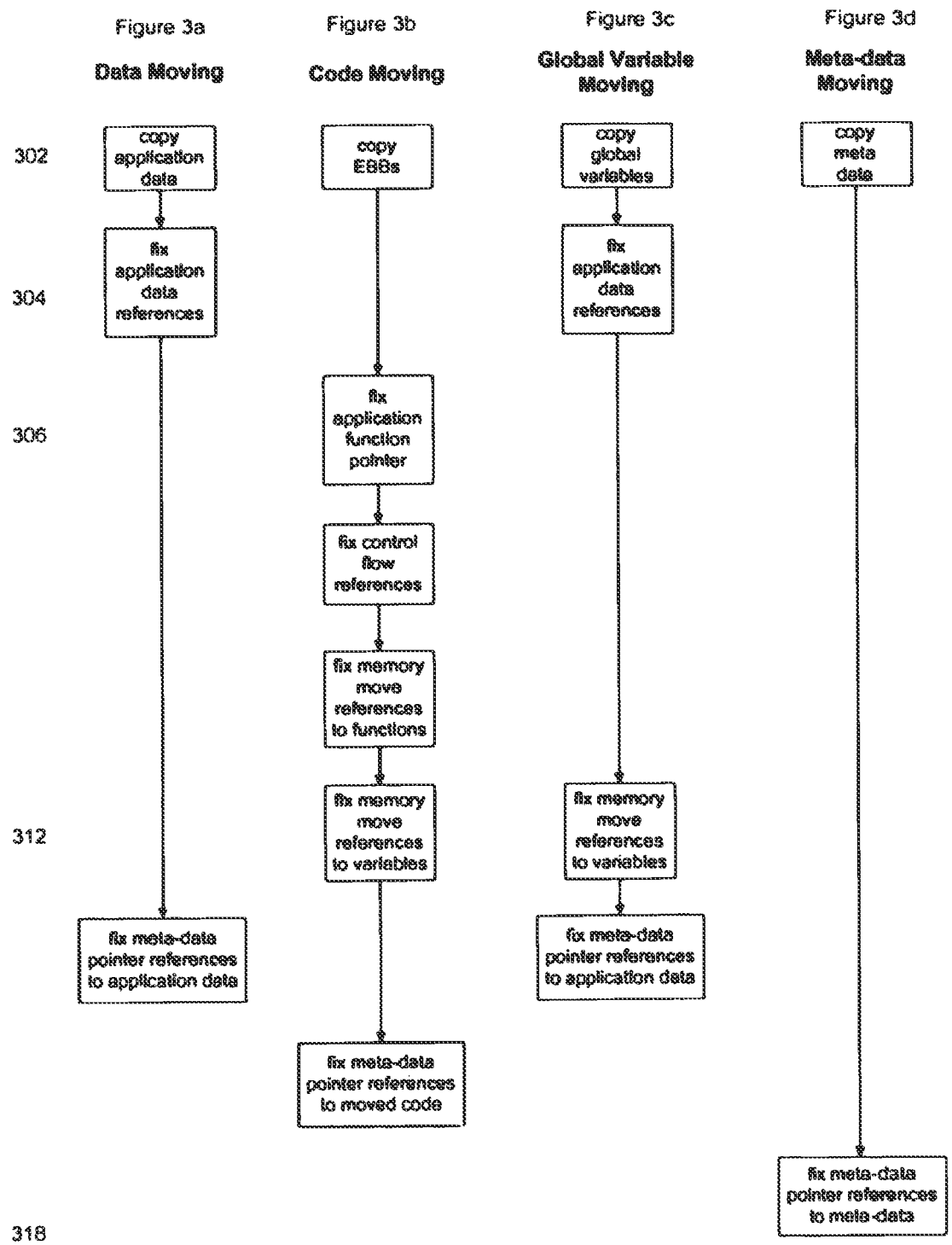
FIG. 3a-3d depict flowcharts to show a comparison of moving and fixing stages for data (3a), code (3b), global variables (3c) and metadata (3d).

With reference to FIG. 2, methods of moving data blocks during runtime execution of a program is disclosed. The disclosed methods are concerned with relocating (moving or copying) one or more data blocks in a memory, when a software program is executing on a computing device (at runtime). Each data block includes a plurality of references for a given code block. The disclosed method for moving data is implemented on a computing device having one or more processors associated with a memory that is accessible by each data block and the associated code block. Although the examples below are discussed for a code block that is an EBB having an associated data block, it is to be understood that the present disclosure is not in any way limited to using EBBs.

In step 202, references for a given code block are provided in a data block, such that all the reference for the given code block are comprised in one data block that is specific to it. Each data block is then associated with its respective code block and may also include any further data objects that are to be dynamically or statically allocated to the code block at runtime. In step 204 the reference index for each of the references for the code block is also associated with the data block. This association is enabled by providing a data index for the data block, such that each of the reference indices for the code block are comprised in or associated with this data index for the data block. Thus, in step 202 and 204 in some embodiments, for each allocated data object, all code-locations where a given data object is accessed are registered. The rationale is that, when data is moved, the addresses in the code locations are to be updated.

In step 206, the data index for each data block in the program is registered in a data register that is stored in or associated with the memory. The data index includes or is associated with an entry for the data block in the data register. The data register includes a plurality of such data indices. This entry or index in some embodiments include or indicates current properties of the data block, including a current data location of the data block in the memory. The purpose is to update all references (that are in all data blocks) to a data block, when the data block is moved. Thus, in step 206 for a given data object all references to the data objects are registered in the data register.

The following additional data structures (in addition to the plurality of reference indices) are stored in the data register and are referenced using the data index, for indicating properties of the references in the data block and to facilitate moving of the data blocks:

i) a type registry that includes details about the size of a data type in a given data block and the number and offsets of pointers for each type.

ii) a location registry for associating each data memory location that contains a data block with an entry in a type registry.

iii) a global reference registry that includes an index of all code blocks of the program that reference global data, i.e. all instructions that that contain an absolute (global) address to data.

In step 208, one or more data blocks are moved during runtime execution of the program from an original or first data location in the memory to a second data location. Like the moving of code blocks in FIG. 1, each data block may be moved more than one times at runtime to several subsequent data locations that are each distinct from each other. All data locations in the memory are also distinct from any code locations in the memory.

Moving a data block includes the operation of copying the data block from a source to a destination data location at runtime.

The location and type registries in the data register provide information required for the operation of moving the data block, including the references within the data block and any further data objects that may be allocated during runtime. The location registry enables identification of where the data block is to be moved from, and the type registry enables identification of how much memory space is required to be allocated for a given data block. A type identifier may be associated with the type registry and the given data block to define a type allocated for each of the references in the data block. The size information enables a determination the amount of memory that is to be occupied by the data block in the memory area after it is moved.

In some embodiments, data (or data block) moving is understood as the movement of data used by the program at runtime that is reachable from certain anchor points. The data as well as the anchor points may be present in the reference and data register for a given code block. An anchor point in some embodiments may be a static or dynamic data object. In some embodiments, the anchor points are usually global variables.

In some embodiments the data block is moved iteratively. For iterative data moving, a state between consecutive data moving operations is stored in the data register using the data index for the data block. During successive iterative data moving operations the following state data structures are stored in the data register and may exist throughout the complete duration of a data moving operation:

i). A stack that is used to implement, for instance, a Depth First Search walk through the data blocks, i.e. all the references for a code block, reachable by an anchor point.

ii) A dictionary that associates a previous data location in the memory for a reference with a new current data location for the reference.

iii). A free list that collects all references that are to be released from the previous data location in the memory after a data moving cycle is completed.

In some example implementations, for iterative data moving, a single data moving iteration consists of two passes which are executed consecutively at runtime of the program.

The first pass moves a certain amount data of blocks reachable through the anchor point. In a first pass a new data location in the memory is allocated for the data block, and the data block (including the references) are copied to the allocated new data location. The previous location of the data block is then added to a list of old data blocks.

Old data blocks refer to the copy or version of the data block in the previous location before moving. The old blocks in some embodiments are collected in the free list but not directly freed. This is because if the old data block in the old memory location is freed, it is possible for a move or copy operation of the program at runtime to erroneously or inadvertently allocate another data block at the same address in the next iteration before a data moving cycle is completed for the data block being moved.

In step 210, the data index in the data register and the associated reference indices in the reference register for the moved data block are updated, or in other words fixed, for the new data location in the memory.

Following on from the example of iterative data moving in step 208, a second pass of iterative data moving operation is concerned with updating or fixing references in the moved data block so that any EBBs or code blocks accessing the references using the reference indices and/or the data index can continue to do so from the new data location. This is implemented by updating all the reference indices to refer to the new data location, based on the data index of the data block updated with the new data location. Once updating or fixing of the reference indices and data index for the block is completed to reflect the new data location, this indicates the completion of a data moving cycle for the data block.

In some embodiments, at the end of a data moving cycle all old data blocks are deleted, i.e. freed from the memory, and previous data location of the moved data block can be reused by the program for moving, i.e. copying another data block.

Some embodiments of the disclosed method for code and data moving in FIGS. 1 and 2 respectively, advantageously prevent an attack on software-based checksums. This is because if code and data moving is performed according to the disclosed methods, the code is then required to be adapted to a new memory layout. According to some embodiments, a congruent memory layout is provided. A congruent memory layout in some embodiments may be defined as one where data access to a virtual memory location x and instruction fetch from virtual memory location x are both mapped to the same physical address. With such a layout a software-based checksum algorithm would be able to detect any changes in the code. If an attacker were to use a redirection attack in the presence of code and data moving methods as provided for in the present disclosure, instruction reads that are used for code and data moves must be distinguished from instruction reads that are used for checksum calculations. This is hard to implement in practice when code and data of a program is moved to random distinct memory locations, and therefore the disclosed method successfully prevents any checksum related attacks on a software program.

For example, let us consider a scenario when the original code is copied from memory location x to memory location y, when a processor or instruction is set up in such a way that data is read/written in location y+delta, but instruction fetch is done from location x+delta. Let us further consider that the code is then modified at location x.

With this setup, the checksum reads code from y+delta, which contains the original code bytes. Consequently, the checksum would be correct. However, the processor fetches instructions from location x+delta, which would contain modified code bytes, i. e. possibly patched by an attacker.

So, the attacker could, in the above scenario, execute the patched code but still be able to calculate the correct checksum.

The above scenario is prevented by embodiments of the present disclosure as the code section would be read for two purposes. First, to calculate a checksum. Second, to be able to perform moving related modifications and fixes on the code, as described. The second action will not work correctly if executed on the original code. This is because the modified code stores the most up to date information that is not found elsewhere, e. g. the current location of the randomly moved data will only be found in the modified code.

So, in the presence of code and data block moving, the checksum attack scenario described above will lead to faulty behaviour of the program.

In some embodiments, as the data blocks are available through anchor points (which are usually global variables), the anchor points are also moved from a first anchor location in the memory to a second and any subsequent anchor location that are distinct from each other. Thus, to move anchor point, the global variables are moved. This is implemented using the code and data indices that are already in the code and data registers respectively.

The code index for a code block in some embodiments includes a record of each global variable for the code block to be moved. The record for a given global variable may include:
  i) The current anchor location in memory for the variable
  ii) The previous anchor location of the variable
  iii) The size of the variable
  iv) a list of variable access locations, i.e. code or data locations that access the variable or are accessed by the variable Like the data blocks, the global variables are also moved iteratively in some embodiments to move only a certain number of global variables at once for a given code and data block. To move a global variable, a new anchor location in the memory for the size of the global variable is allocated and the variable content is copied from a current anchor location to the newly allocated anchor location in the memory. Once the variable content is moved, all references associated with the variable in the code register, reference register and data register are updated, i.e. fixed, to the global variable in the new anchor location. This may be implemented using a list of code blocks that access the variable, which is available in the code register. Global variables are not only referenced in other EBBs or code blocks, but also in the references in the data blocks. Therefore, the data index and any associated reference indices are also updated with the new anchor location after the global variable is moved.

In some embodiments, metadata is generated during runtime of a software program, and therefore metadata is also generated each time a code block or a data block is moved at runtime. Metadata may in some cases be associated with the same memory location as its associated data block and thus may also be susceptible to attacks. Metadata may be also stored in a Random-Access Memory of a processor. This would therefore make it accessible to an attacker if they could access the RAM of the processor. Related to this, in some embodiments in order to prevent an attacker from analysing the metadata to try to deduce new data or code locations, the metadata is also moved to different metadata locations in the memory during runtime. One or more meta-data structures that store information about moved code and/or data blocks of the executing program at a given instance are provided. For a program, metadata includes information about the references, data blocks, code blocks and global variables in the program. These metadata structures are then moved, i.e. copied, to a new metadata location in the memory in an analogous manner to the moving of data blocks set out in FIG. 2. In some embodiments, the metadata associated with a data block is moved along with the data block.

As an alternative to the above described embodiment of moving metadata, to improve resilience against attacks, an option could be to process the metadata in a protected environment, that is not available for inspection by an attacker. For example, could be moved into a Software Guard Extension (SGX) container. In this scenario the embodiments of metadata moving may not increase the security and could be skipped.

FIGS. 3a to 3d provide an overview of the moving, i.e. copying, and updating, i.e. fixing operations for code, data, global variables and meta data discussed in the present disclosure. These figures illustrate some, but not all, dependencies between data moving in FIG. 3a, code moving in FIG. 3b and global variable moving in FIG. 3c. Data moving and code moving both require fixing of references and meta-data to application data in steps 304 and 306, i.e. the data blocks. Code moving and global variable moving both require fixing of memory move references to variables in step 312. Another dependency that is not illustrated in the figure is that moving meta-data in FIG. 3d influences all copy operations, except "copying meta-data", in step 302 and all fixing operations, except "fixing meta-data pointer references to meta-data" in step 318. This is because these copying and fixing operations use the meta-data to perform the copying and fixing operation. In some embodiments, separate meta-data is generated for copying meta-data in step 302 and for fixing meta-data pointer references to meta-data in step 318, that may be independent from the meta-data used for the other moving and fixing operations for code, data and global variables.

Figure 4:
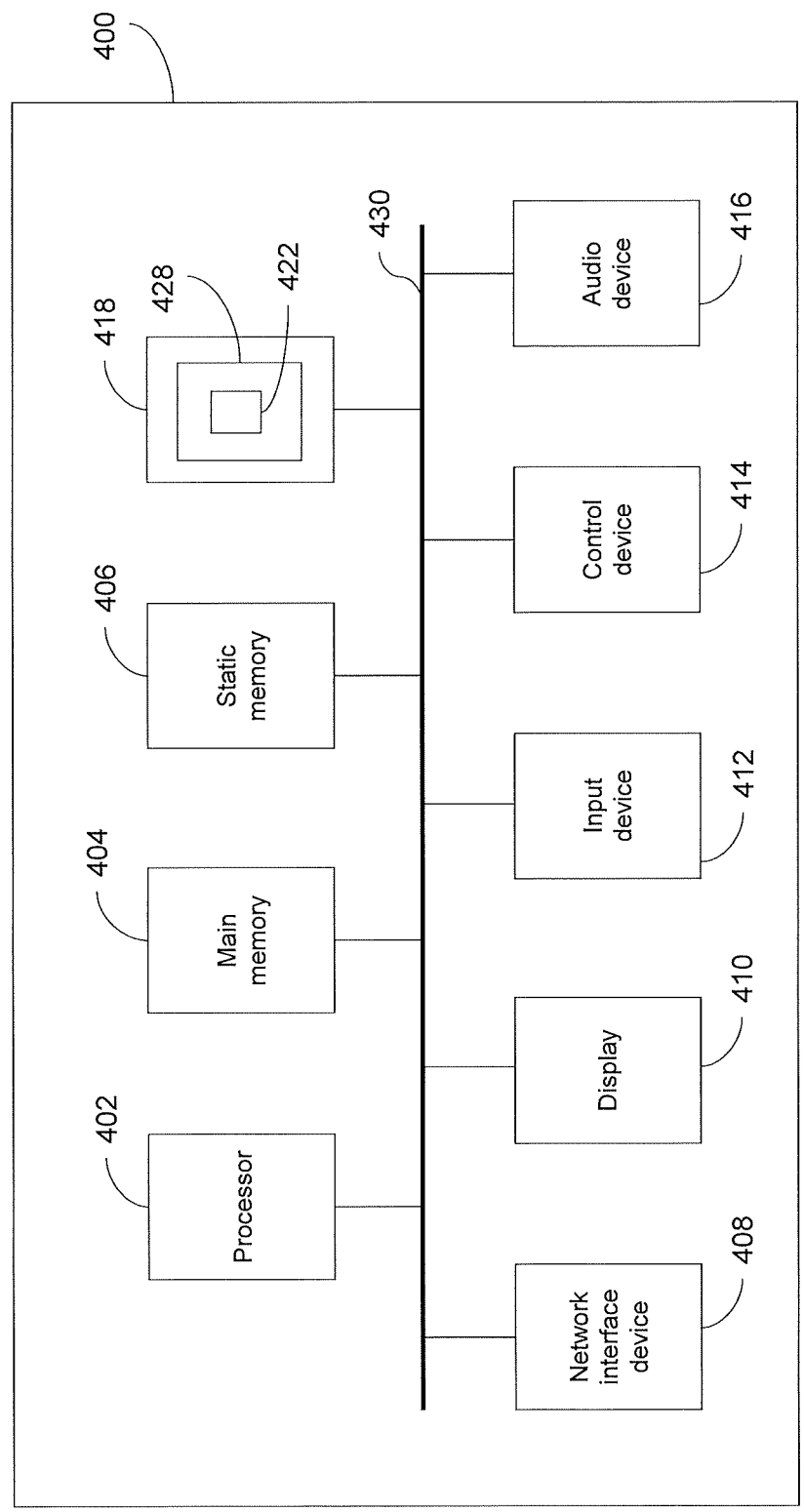
FIG. 4 depicts a computing device for moving code blocks and/or data block at runtime according to the disclosed method.

FIG. 4 illustrates a block diagram of one implementation of a computing device 400 within which a set of instructions, for causing the computing device to perform any one or more of the methodologies discussed herein, may be executed. The computing device 400 may be any server (standalone, distributed or cloud based), client, network or mainframe processing device at or for which sensitive information is handled, i.e. stored and analysed, for its operation. Such device can be a VOD client device or a content distribution network where access to certain content is based on a user authentication. Similarly, the computing device 400 may also relate to an example implementation of the source of the video stream. In alternative implementations, the computing device 400 may be connected (e.g., networked) to other machines in a Local Area Network (LAN), an intranet, an extranet, or the Internet. The computing device may operate in the capacity of a server or a client machine in a client-server network environment, or as a peer machine in a peer-to-peer (or distributed) network environment. The computing device may be a personal computer (PC), a tablet computer, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single computing device is illustrated, the term "computing device" shall also be taken to include any collection of machines (e.g., computers) that individually or jointly execute a set (or multiple sets) of instructions to perform any one or more of the methodologies discussed herein.

The example computing device 400 includes a processing device 402, a main memory 404 (e.g., read-only memory (ROM), flash memory, dynamic random-access memory (DRAM) such as synchronous DRAM (SDRAM) or Rambus DRAM (RDRAM), etc.), a static memory 406 (e.g., flash memory, static random-access memory (SRAM), etc.), and a secondary memory (e.g., a data storage device 418), which communicate with each other via a bus 430.

Processing device 402 represents one or more general-purpose processors such as a microprocessor, central processing unit, or the like. More particularly, the processing device 402 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 402 may also be one or more special-purpose processing devices such as an application specific integrated circuit (ASIC), a field programmable gate array (FPGA), a digital signal processor (DSP), network processor, or the like. Processing device 402 is configured to execute the processing logic (instructions 422) for performing the operations and steps discussed herein.

The computing device 400 may further include a network interface device 408. The computing device 400 also may include a video display unit 410 (e.g., a liquid crystal display (LCD) or a cathode ray tube (CRT)), an alphanumeric input device 412 (e.g., a keyboard or touchscreen), a cursor control device 414 (e.g., a mouse or touchscreen), and an audio device 416 (e.g., a speaker).

The data storage device 418 may include one or more machine-readable storage media (or more specifically one or more non-transitory computer-readable storage media) 428 on which is stored one or more sets of instructions 422 embodying any one or more of the methodologies or functions described herein. The instructions 422 may also reside, completely or at least partially, within the main memory 404 and/or within the processing device 402 during execution thereof by the computer system 400, the main memory 404 and the processing device 402 also constituting computer-readable storage media.

The various methods described above may be implemented by a computer program. The computer program may include computer code arranged to instruct a computer to perform the functions of one or more of the various methods described above. The computer program and/or the code for performing such methods may be provided to an apparatus, such as a computer, on one or more computer readable media or, more generally, a computer program product. The computer readable media may be transitory or non-transitory. The one or more computer readable media could be, for example, an electronic, magnetic, optical, electromagnetic, infrared, or semiconductor system, or a propagation medium for data transmission, for example for downloading the code over the Internet. Alternatively, the one or more computer readable media could take the form of one or more physical computer readable media such as semiconductor or solid-state memory, magnetic tape, a removable computer diskette, a random-access memory (RAM), a read-only memory (ROM), a rigid magnetic disc, and an optical disk, such as a CD-ROM, CD-R/W or DVD.

In an implementation, the modules, components and other features described herein can be implemented as discrete components or integrated in the functionality of hardware components such as ASICS, FPGAs, DSPs or similar devices.

A "hardware component" is a tangible (e.g., non-transitory) physical component (e.g., a set of one or more processors) capable of performing certain operations and may be configured or arranged in a certain physical manner. A hardware component may include dedicated circuitry or logic that is permanently configured to perform certain operations. A hardware component may be or include a special-purpose processor, such as a field programmable gate array (FPGA) or an ASIC. A hardware component may also include programmable logic or circuitry that is temporarily configured by software to perform certain operations.

Accordingly, the phrase "hardware component" should be understood to encompass a tangible entity that may be physically constructed, permanently configured (e.g., hardwired), or temporarily configured (e.g., programmed) to operate in a certain manner or to perform certain operations described herein.

In addition, the modules and components can be implemented as firmware or functional circuitry within hardware devices. Further, the modules and components can be implemented in any combination of hardware devices and software components, or only in software (e.g., code stored or otherwise embodied in a machine-readable medium or in a transmission medium).

Unless specifically stated otherwise, as apparent from the following discussion, it is appreciated that throughout the description, discussions utilizing terms such as "receiving", "determining", "obtaining", "sending," "implementing,", "detecting", "extracting", "establishing", "providing", "moving", "fixing", "splitting", "separating", "associating", "identifying" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

It is to be understood that the above description is intended to be illustrative, and not restrictive. Many other implementations will be apparent to those of skill in the art upon reading and understanding the above description. Although the present disclosure has been described with reference to specific example implementations, it will be recognized that the disclosure is not limited to the implementations described but can be practiced with modification and alteration within the spirit and scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

The invention claimed is:

1. A method of generating code to protect sensitive data used by a program, the method being implemented by one or more processors associated with a memory, the method comprising:
    partitioning a program into a plurality of code blocks;
    registering a code block of the plurality of code blocks in a code register using a code index, the code index being an entry in the code register for a given code block indicating current properties of the given code block, the current properties including a current code location of the code block in the memory; and
    registering each of one or more references that are accessed by the given code block or that access the given code block in a reference register using a reference index, the reference index being an entry in the reference register for a given reference,
    wherein the method further comprises, during runtime execution of the program:
    moving at least one of the plurality of code blocks from a first code location in the memory to a respective second code location in the memory, such that the moved code block is accessible from the second code location after it is moved, the second code location being different from to the first code location;
    updating the code index of the moved code block to indicate the second code location; and
    updating the one or more reference indices for the moved code block based on updated current properties of the code index of the moved code block;
    wherein the data register for the program comprises:
    a location registry for associating each data location in the memory that contains a data block with an entry in a type registry, wherein the data locations are obtained from the data index of each data block in the program;
    the type registry, comprising a size and data type of each reference in each data block, number of control flow instructions or function pointers for each data type and an offset in the program for each control flow instruction or function pointer for a data type; and
    a global reference registry comprising an index of all code blocks in the program that reference global data or variables.

2. The method as claimed in claim 1 wherein the one or more references for the given code block is comprised in a data block associated with the code block, and the reference index of each of the one or more references is comprised in or associated with a data index for the data block, the data index indicating current properties of the data block, including a current location of the data block in the memory, and wherein the data index is registered in a data register.

3. The method as claimed in claim 2 wherein more than one data blocks are associated with the given code block and at least one of the more than one data blocks is associated with one or more other code blocks of the plurality of code blocks for the program.

4. The method according to claim 1 wherein the one or more references for the given code block include at least one of data objects, data structures, variables, control flow instructions or function pointers, and wherein the one or more references include sensitive data.

5. The method according to claim 1 wherein each code block of the plurality of code blocks is a basic block representing a portion of the program that is executable at runtime without relying on other parts of the program for its execution.

6. The method as claimed in claim 5 wherein each code block is an extended basic block, EBB, comprising a plurality of consecutive basic blocks with the last basic block ending in an unconditional branch or jump instruction.

7. The method as claimed in claim 6 wherein one or more control flow instructions or function pointers that are in the one or more references for the EBB are adapted to the second code location after the EBB is moved to the second location by adding a jump table at the end of the EBB.

8. The method according to claim 1 further comprising:
    during runtime execution of the program, moving a data block associated with a code block of the program from a first data location in the memory to a second data location in the memory, such that the data block is accessible from the second data location in the memory after it is moved, wherein the second data location is different to the first data location, and wherein the first and second data locations are different to the first and second code locations in the memory; updating the data index of the moved data block to indicate the second data location; and updating the one or more reference indices in or associated with the data block based on the current properties of the data index of the data block;

wherein optionally, the method further comprises:

modifying a portion of code within a code block, when one or more data blocks that are accessed by the code block is moved.

9. The method according to claim 1 wherein moving a code block among the plurality of code blocks, and/or a data block associated with the code block in the program during runtime execution includes, copying the code block and/or data block to its respective second code location or second data location in the memory from an original location in the memory for the code block and the data block.

10. The method according to claim 1 wherein moving a code block among the plurality of code blocks and/or a data block associated with the code block during runtime execution of the program occurs periodically or randomly or a combination of both.

11. The method according to claim 1 comprising:

generating or obtaining metadata for moving each code block and/or each data block in the program; and moving the metadata from a first metadata location in the memory to a second metadata location in the memory during runtime execution of the program.

12. The method according to claim 1, wherein moving at least one of the plurality of code blocks during runtime execution of the program includes moving the code block to one or more subsequent locations in the memory, each subsequent location being distinct to any other previous code location of the code block.

13. A computing device or system including at least one processor associated with a memory and/or a transitory or non-transitory medium for storing data and programming instructions, wherein the processor is configured to execute the programming instructions to implement the method of generating code to protect sensitive data used by a program, the method comprising:

partitioning a program into a plurality of code blocks;

registering a code block of the plurality of code blocks in a code register using a code index, the code index being an entry in the code register for a given code block indicating current properties of the given code block, the current properties including a current code location of the code block in the memory; and registering each of one or more references that are accessed by the given code block or that access the given code block in a reference register using a reference index, the reference index being an entry in the reference register for a given reference, wherein the method further comprises, during runtime execution of the program:

moving at least one of the plurality of code blocks from a first code location in the memory to a respective second code location in the memory, such that the moved code block is accessible from the second code location after it is moved, the second code location being different to the first code location;

updating the code index of the moved code block to indicate the second code location; and updating the one or more reference indices for the moved code block based on updated current properties of the code index of the moved code block;

wherein the data register for the program comprises:

a location registry for associating each data location in the memory that contains a data block with an entry in a type registry, wherein the data locations are obtained from the data index of each data block in the program;

a type registry comprising a size and data type of each reference in each data block, number of control flow instructions or function pointers for each data type and an offset in the program for each control flow instruction or function pointer for a data type; and a global reference registry comprising an index of all code blocks in the program that reference global data or variables.

* * * * *